United States Patent [19]

Kelly, Jr.

[11] Patent Number: 4,941,168
[45] Date of Patent: Jul. 10, 1990

[54] SYSTEM FOR THE RECOGNITION OF AUTOMATED TELEPHONE ANSWERING DEVICES AND DELIVERY OF PRERECORDED MESSAGES TO SUCH DEVICES

[75] Inventor: Joseph J. Kelly, Jr., Joplin, Mo.

[73] Assignee: U.S. Telecom International Inc., Joplin, Mo.

[21] Appl. No.: 247,200

[22] Filed: Sep. 21, 1988

[51] Int. Cl.⁵ .............................................. H04M 3/46
[52] U.S. Cl. ........................................ 379/69; 379/92
[58] Field of Search ........................ 379/67, 69, 88, 80, 379/92, 216, 79; 369/50

[56] References Cited

U.S. PATENT DOCUMENTS

| | | | |
|---|---|---|---|
| 4,188,510 | 2/1980 | Bower et al. | 379/69 |
| 4,438,296 | 3/1984 | Smith | 379/69 |
| 4,477,698 | 10/1984 | Szlam et al. | |
| 4,492,820 | 1/1985 | Kennard et al. | |
| 4,539,435 | 9/1985 | Eckman. | |
| 4,539,436 | 9/1985 | Theis. | |
| 4,591,664 | 5/1986 | Freeman. | |
| 4,667,065 | 5/1987 | Bangerler | 379/351 |
| 4,692,817 | 9/1987 | Theis | 360/12 |

Primary Examiner—Alan Faber
Assistant Examiner—James E. Tomassini
Attorney, Agent, or Firm—Morgan & Finnegan

[57] ABSTRACT

This invention relates to an automated telephone dialing system, for recognizing electronically, whether a called party is a human subject or an automated telephone answering device, and for delivery of pre-recorded messages in synchronization with the activation of the receive function of an automatic answering machine. The determination of whether a called party is human or an answering device is made based on analysis of the party's response to an audio instruction. The system delivers pre-recorded messages to a live party or to an automated answering device in the time sequence required or recording of the message by the answering device.

23 Claims, 8 Drawing Sheets

SYSTEM FOR THE RECOGNITION OF AUTOMATED TELEPHONE ANSWERING DEVICES AND DELIVERY OF PRERECORDED MESSAGES TO SUCH DEVICES

TECHNICAL FIELD

The present inventionrelates to automatic telephone systems for detecting the presence on the telephone line of an automated telephone answering device and for the delivery of pre-recorded messages to automated telephone answering apparatus.

BACKGROUND AND OBJECTS OF THE INVENTION

Automated telephone and dialing devices ("Dial and Deliver") are now commonly employed to deliver pre-recorded voice messages to each party on a prepared list of telephone numbers. Such devices, under the control of a micro-processor, are able to deliver economically pre-recorded voice messages to great numbers of parties. These devices are often used to provide pre-recorded promotional messages, solicitations for sales, and emergency information.

However, the practical utility of automated telephone dialing devices and pre-recorded message delivery systems has been significantly decreased by the widespread use of automated telephone answering machines.

If a conventional automatic telephone dialing system dials.the number of a telephone which is answered by an automatic answering apparatus, the pre-recorded message will not be delivered to the intended party. Lengthy pre-recorded messages may be played out even though no human is on the line to hear the message as may have been intended. Such a result obviously significantly lessens the cost-effectiveness and efficiency of using the automatic pre-recording message delivery system. Moreover, the pre-recorded message may never be delivered in the necessary time synchronization with the answering device to allow recording.

Prior systems directed to solve this problem are complex and unreliable. One method to serve this objective is to utilize the difference in frequency characteristics of a sound generated by a machine from the frequency characteristics generated by a human voice. This technique is very complex, and requires the design of highly complicated signal processing circuits. Some other systems have utilized the differences between the ways a telephone call is answered by a live party and the ways a message is recorded on an answering machine. For example, specific intervals of audio silence are looked for, during the first few seconds after a call is connected to detect a normal "Hello", which is usually one to four seconds of audio, followed by one to two seconds of silence. Recordings generally do not contain a pause after a "Hello." This difference enables the calling device to determine the presence or absence of a live person.

Prior art systems based on passive detection approach suffer from a significant degree of error. The duration of sound and silence to be tested, can only be optimized for a statistical average. Persons who do not answer within such statistical limits, will be considered machines and their call will be terminated. With recent advances in technology, announcement messages recorded on telephone answering devices are virtually indistinguishable from human voice, invalidating passive detection algorithms based on frequency characteristics of tape generated audio.

It is an object of this invention to provide an automatic system for the delivery of pre-recorded telephone messages which is able to efficiently and economically identify when it has reached a telephone answering device and not a human person.

It is a further object of this invention to provide an automated telephone system which, upon recognition on the line of an automated answering machine, is capable of delivering a pre-recorded message in time synchronization with the receive function of the answering machine so as to assure recording of the message by the answering apparatus.

SUMMARY OF THE INVENTION

The automated telephone dialing system of the invention comprises automated dialing devices and switches capable of providing interconnections to any of a series of telephone receivers, devices for delivery of pre-recorded messages to the called party, a computer processor device for activation of the message delivery function and an audio-instruction delivery device which directs the answering party to respond in a specified manner. For instance, this device may direct the called party to depress a telephone key, to remain silent for a specific period of time, or to key in a specified sequence of number or letters.

Depending upon how the answering party responds to the audio instruction delivery, the automated delivery system of the present delivery system invention determines if the respondent is either human or machine. If the answering party is designated as human, the automatic delivery message unit proceeds to play out the pre-recorded message. If the answering party is determined to be an answering machine, the automatic dial and message delivery system activates delivery of the pre-recorded message in the time sequence required to assure the recording of the message by the recording machine.

DETAILED DESCRIPTION OF THE PREFERRED EMBODIMENT

In order to afford a complete understanding of the invention and an appreciation of its advantages, a preferred embodiment is presented below in the context of a practical environment including a supervisory computer, a disk storing means, audio/telephony interface circuitry to couple the telephone lines to the computer, and a digital to analog converter.

It will be obvious to those skilled in the art that the components of the present invention as described and illustrated hereinafter, could be arranged and designed in a wide variety of configurations. Thus, the following more detailed description of the embodiment of the apparatus of present invention as represented in FIGS. 1-10, and Appendix, is not intended to limit the scope of the invention, as claimed, but is merely representative of the presently preferred embodiment of the invention.

Figure 1:
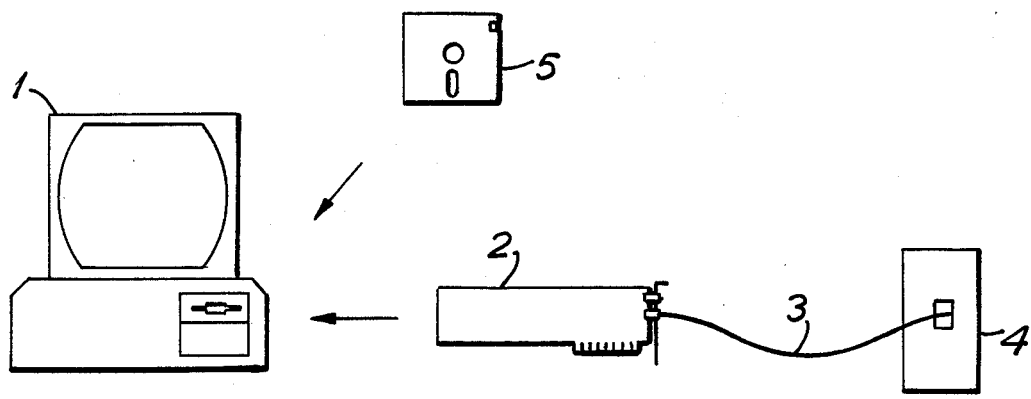
FIG. 1 is a pictorial diagram of a system embodying the present invention.
Figure 2:
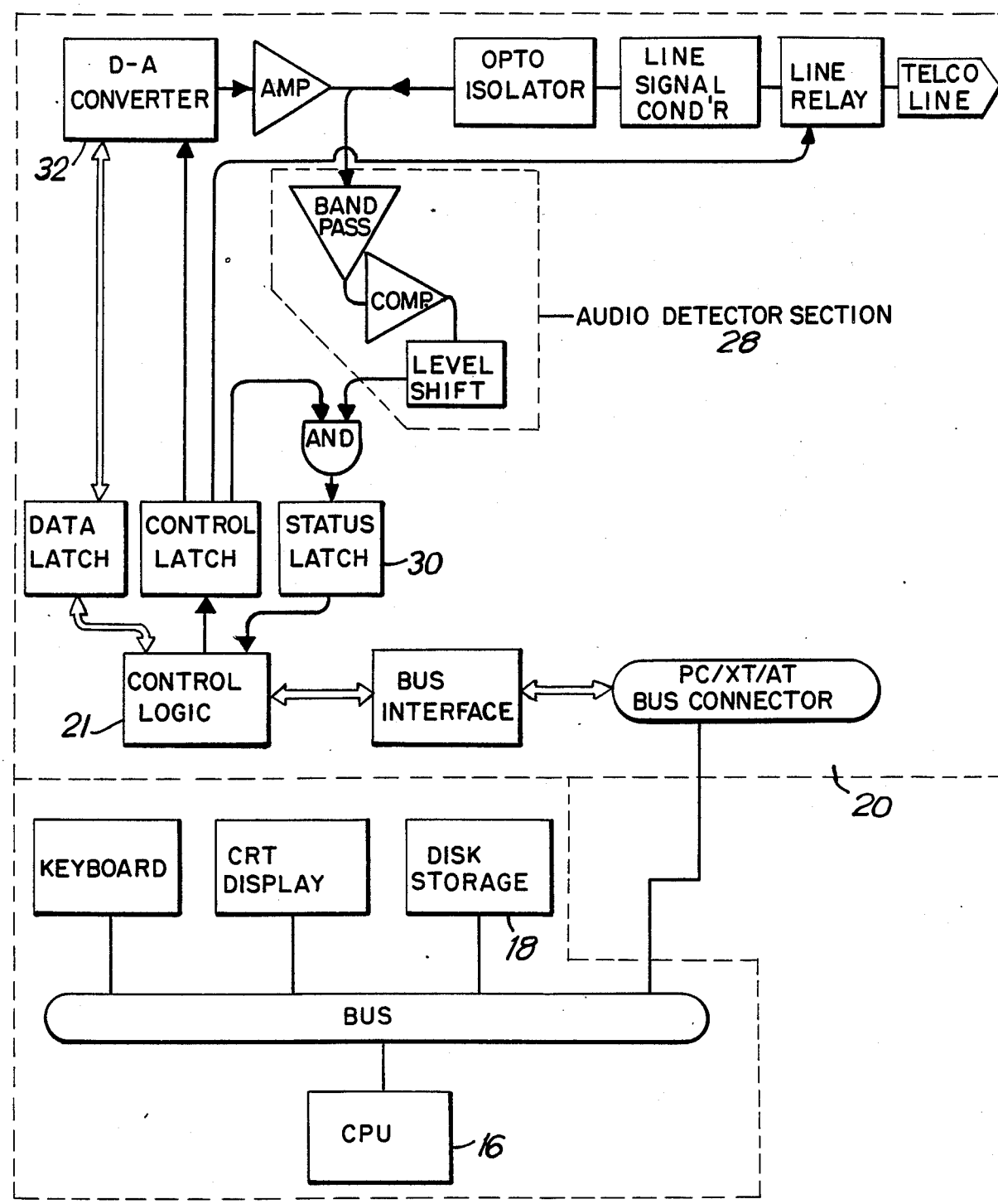
FIG. 2 is a block diagram of a system illustrating the components of the telephone dialing device.

Referring first to FIGS. 1 and 2, the components of the automatic dialing device are physically depicted. Supervisory computer 1, controls the flow of audio and control signals. Audio/telephony interface circuitry or line card 2, interfaces the telephone line with the computer, allowing the computer to receive audio and control signals and transmit the same. Cord 3 and jack 4 represent a connecting means to the telephone line. Storage means 5 is a computer diskette for storing relevant control and audio information.

Referring to FIG. 2, a general description of the invention is presented. The system can initiate a dialing sequence manually, or at a predetermined time. The CPU 16 upon such time receives instruction from a disk storage 18 to initiate a call. This instruction will in turn translate into a control signal, carried through a bus into the audio/telephony Card 20, and Control logic 21, instructing the line relay to go "off hook." A call is initiated, and audio detector 28 of card 20 is used to detect the presence or absence of audio signals in the line. Such determination will be stored in status latch 30. Control signals flowing to and from the CPU, determine the mode of the operations and also allow for voice interaction with a called party. Voice messages in digital form are stored in disk storage 18. Upon receiving control signal from CPU 16, digital information representing a voice message is transferred to card 20, and is converted into analog form by analog to digital converter 32. The voice message now represented in analog form is transmitted to the called party. Information received from the called party is converted into a status signal by audio detector 28, and is sent to CPU 16. The CPU 16 by comparing this status signals with previous stored information, determines if the called party is a live person or a machine.

If a called party is determined to be a live person, additional voice messages represented in digital form and stored in disk storage 18 are transferred to card 20, and thereafter are converted to analog voice signal and interact with the called party. Received responses are converted back to digital form by the analog to digital converter 32 and are finally stored in disk storage 18.

If a called party is determined to be a machine, the CPU 16 generates control signals to transmit appropriate messages to the answering device during the period allowed for recording. CPU 16 will also generate signals indicating the absences of a live person. Digital data representing those signals are then stored in storage 18. The CPU 16 will initialize another call and the same functions are repeated.

Figure 3:
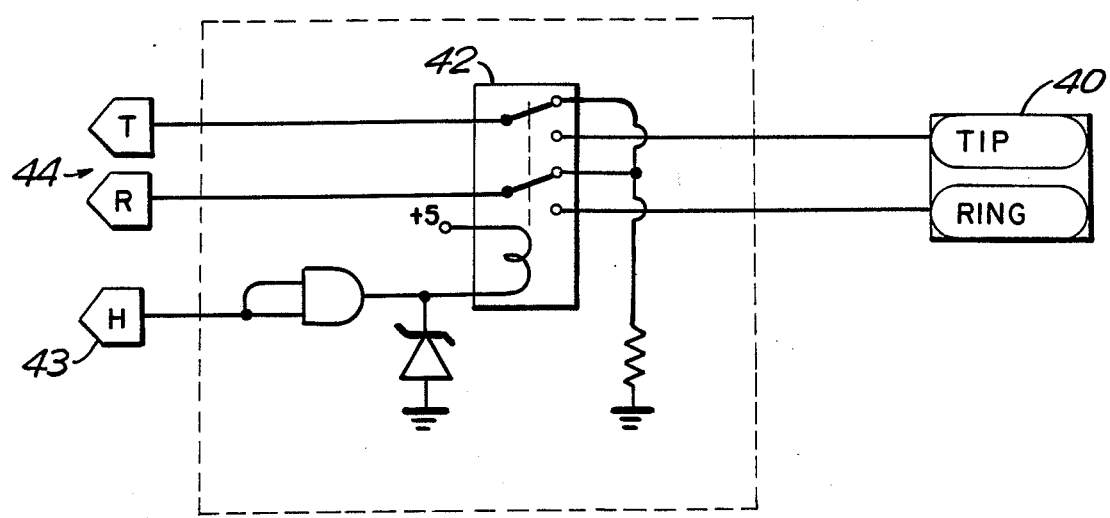
FIG. 3 is a schematic diagram of the line relay circuit utilized to connect the telephone line to the telephone dialing device.
Figure 4:
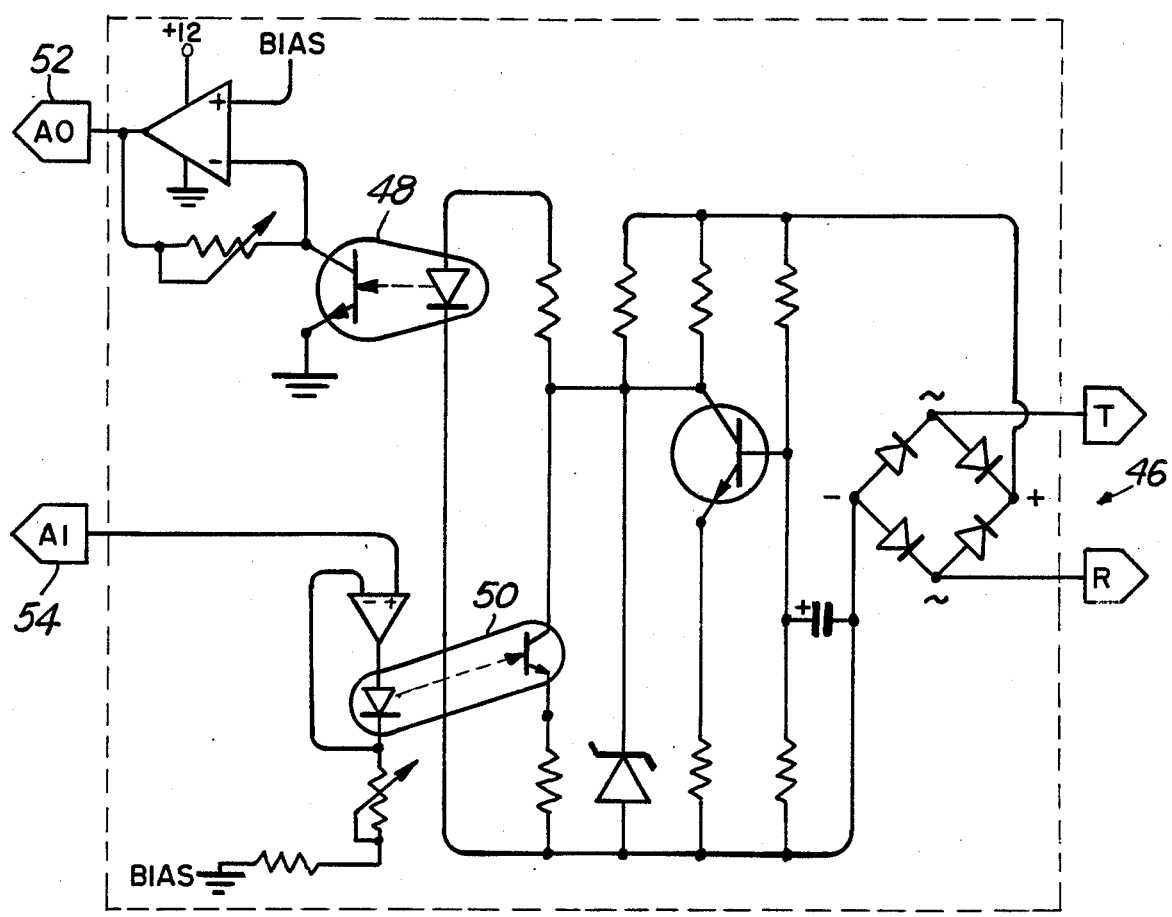
FIG. 4 is a schematic diagram of a line signal conditioning and opto-isolator circuit to couple the telephone line to the rest of the telephone dialing device.
Figure 5:
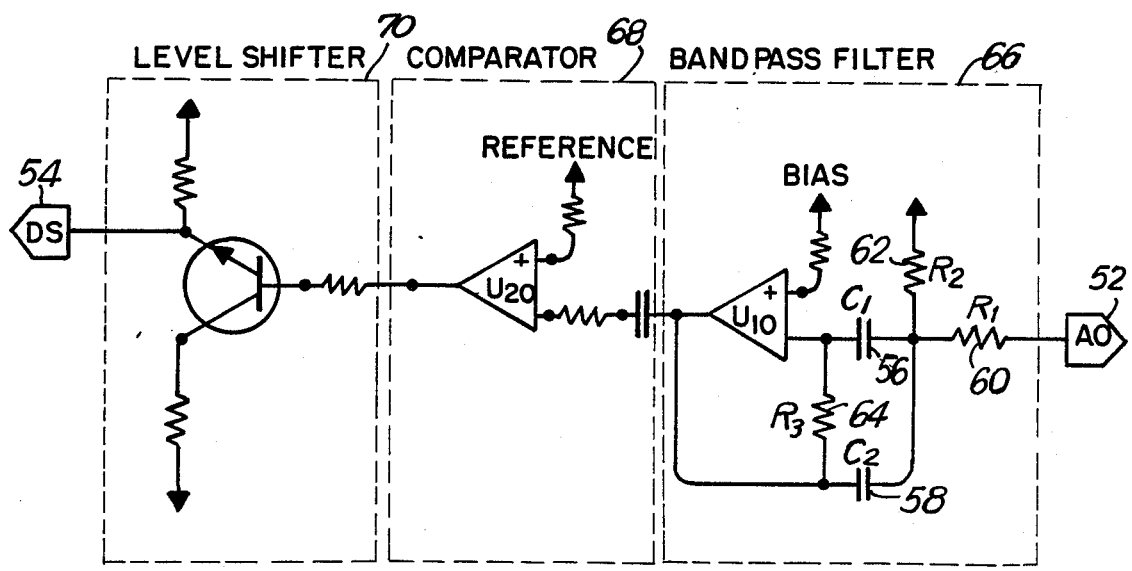
FIG. 5 is a schematic diagram illustrating an audio detector circuit formed by a band pass filter, a comparator and a level shifter, all utilized to detect the presence or absence of an audio signal in the telephone line.

Referring to FIGS. 3-5 the pertinent parts of the interface circuitry utilized in the present preferred embodiment is illustrated. FIGS. 3-5 show the protective circuitry of the interface section of the audio/telephony interface adapter. The audio path in an actual connection will be described now in more detail. In FIG. 3 the "tip" and the "ring" lead of telephone jack 40 are connected to a line control relay 42. When appropriate, the system sends a control signal to line relay circuit via lead "H" 43 to change the "hook" state. As shown in FIG. 4 when "off hook" the line audio is passed through the relay to the adaptor's line signal conditioning circuit 46 by "tip" and "ring" lead 44. The audio signal is conditioned using rectifying, filtering, and gain controlling circuitry. After conditioning, the signal is fed to the adaptor's audio detection and analog to digital conversion sections through the analog output lead "AO" 52. The telephone line is isolated from CPU 16 and its peripherals for obvious reasons to those skilled in the art. In this embodiment the telephone lines have been isolated by use of opto-isolators 48 and 50.

The audio signal from the telephone line is provided to audio detector circuit of FIG. 5, by input lead "AO" 52. The purpose of audio detector is to indicate the presence of any audio signal on the telephone line, which is above a certain threshold level. One purpose for fixing the threshold level is to discriminate against noise signals. Upon detection of such an audio signal, the audio detector transmits a signal through lead "DS" 54. The data provided by the audio detector circuit is utilized by the microprocessor program.

The first stage of the audio detector circuit of FIG. 5 comprises an operational amplifier $U_{10}$ and capacitors $C_1$ 56 and $C_2$ 58 and resistors $R_1$ 60, $R_2$ 62 and $R_3$ 64 which form an active band pass filter well known to those skilled in the art The output of the filter is fed into a comparator 68. The comparator 68 comprises of an operational amplifier $U_{20}$, which compares the voltage fed out of the band pass filter with a reference voltage. The output of the comparator shifts between high and low levels depending on the voltage fed from the band pass section.

This shift of level is in turn translated into a status signal by a level shifter circuitry 70. Therefore, lead "DS" 54 indicates a presence or absence of an audio signal in the telephone line. The digital to analog and analog to digital converters are already familiar with those skilled in the art.

The system operation of the present invention, implemented in the preferred embodiment, is illustrated by the flow charts of FIGS. 6-9 and the Appendix. Those skilled in the art will readily appreciate that other specific methods may be used in accordance with the present invention and that flow charts of FIGS. 6 through 9 may be modified without departing from the scope of the present invention.

Moreover, the flow chart of FIGS. 6 through 9 illustrate one way of implementing the present invention using a personal computer and taking advantage of the particular characteristics of the computer. Thus, the following description of the flow chart of FIGS. 6-9 is intended by way of illustration only, and not limitation.

Figure 6:
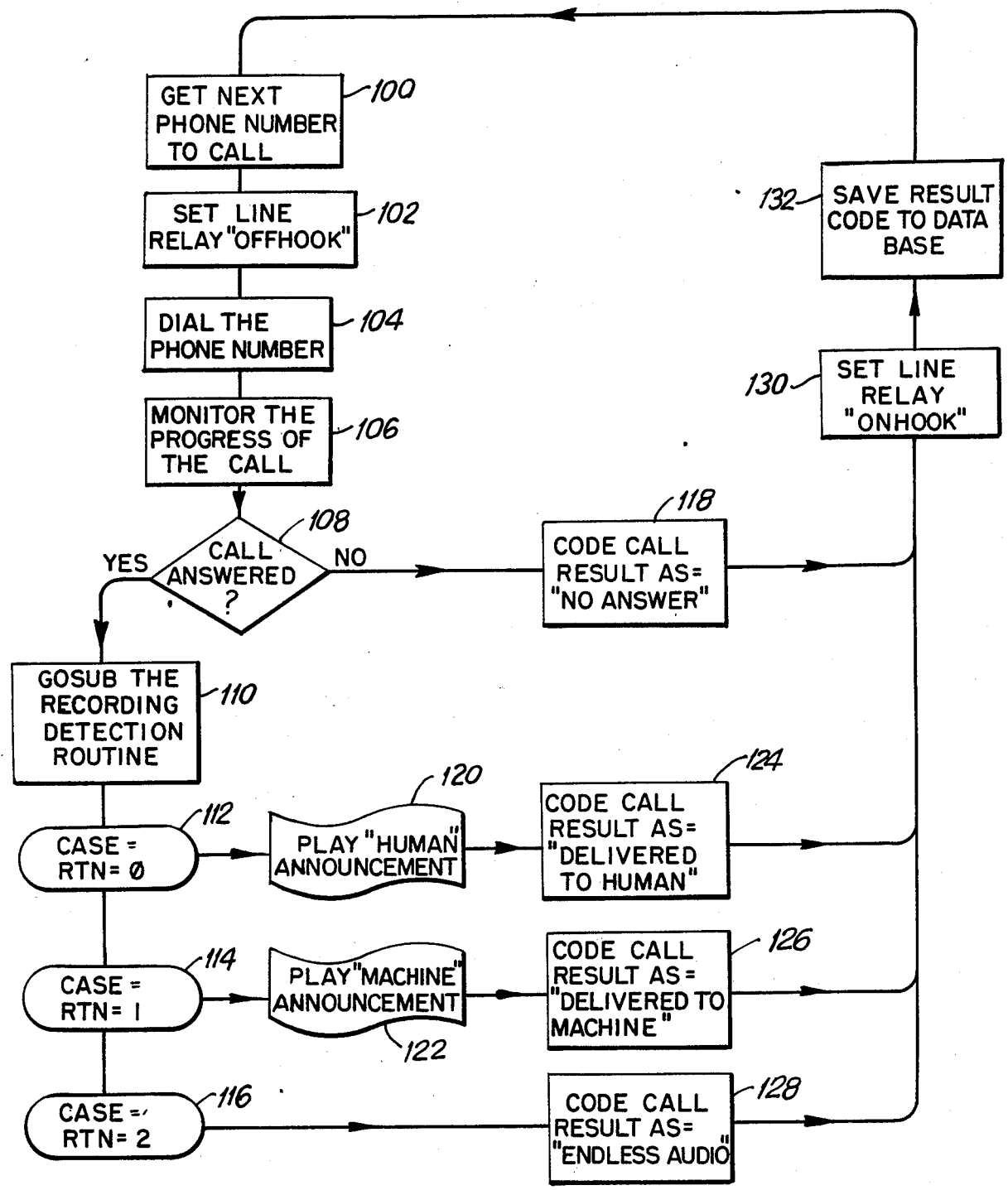
FIG. 6 illustrates the logical diagram of the operation of the present invention.

With reference to FIG. 6, the system will begin operating with the Main Logic Loop. It is assumed that a retrievable data file of phone numbers exists on one of the personal computer's disk drives. One cycle through the Main Logic Loop is made for each phone number contained in the data base. The loop begins at step 100, and a new phone number is read from the data file. At step 102 software instructions are translated by the CPU into control signals that are fed into the audio/telephony interface adapter, to latch the relays into "off hook", and to dial the phone number at step 104. The system at step 106, monitors the progress of the call to determine if it was answered. There are many techniques available in the prior art to monitor the progress of the call. For example, this may be accomplished by simply monitoring the loop current change in the telephone line, which occurs when the remote phone is lifted off hook. At step 108, the system after a certain period of time when the call is not answered, sends a signal representing "no answer" at 118. Consequently at 130, the system transmits another control signal setting the line relay "on hook". The "no answer" code is then written into the database at step 132 and then Main Logic Loop is begun again with the next phone number at step 100.

If at step 108 the call is answered the system moves to step 110, which is the Recording Detection Operation. The Recording Detection Operation likewise calls the Silence Detection Operation. The system logic of step 110 is illustrated in FIG. 7 which will be later explained in detail.

Completion of operations at step 110 results in one of three possible codes represented by a "RTN" signal at steps 112, 114 and 116. If RTN is 0, system moves to 112, where the answering party is determined to be a person. The system moves to step 120, where digital data representing a voice message are converted to analog signal, and transmitted to the called party. At step 124, a code results, indicating that the message was delivered to a human. The system then moves to 130 whose operation has been discussed previously. If RTN is "1", the system moves to step 114, which indicates that the answering party was determined to be a recording which stopped within a predefined period. The system moves to step 122, where an announcement message intended for answering devices is played. At step 126, a code results, indicating that the message was delivered to a machine. The system then moves to 130, whose operation has been discussed previously.

If RTN is "2", the system moves to step 116, which indicates that the answering party was determined to be a recording which did not stop within a predefined period. No announcement message is played. At step 128, a code results, indicating that the called party was an endless audio. The system then moves to step 130, whose operation has been discussed previously.

Figure 7:
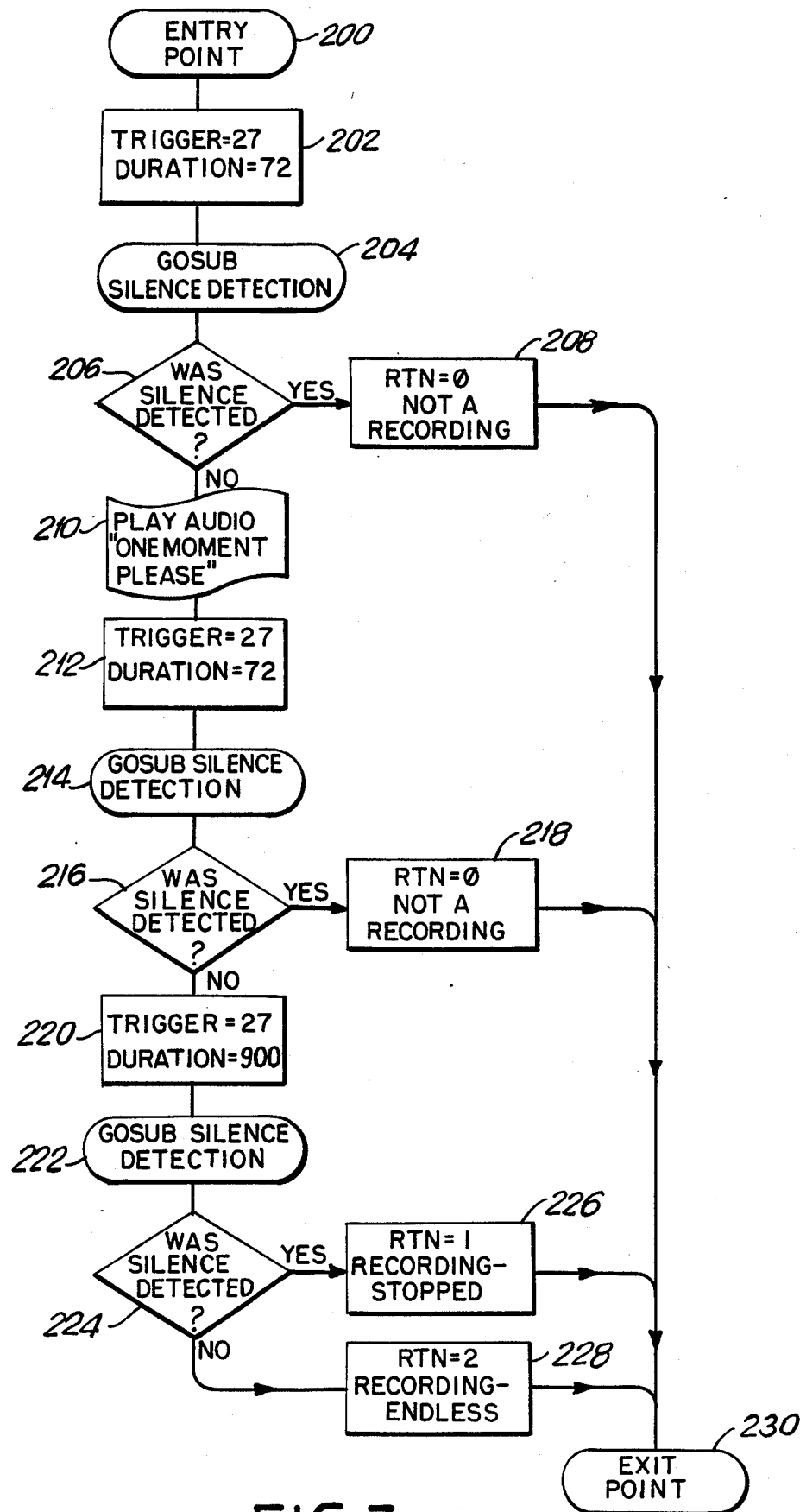
FIG. 7 illustrates the logical diagram of the operations determining the presence or absence of a recording.

Referring now to FIG. 7, the logic operations of step 110 of FIG. 6 is further explained. The system, in order to detect a recording, moves to step 200. Depending on the results of each test, successive tests are conducted to determine the status of the called party. Initially the system moves to step 202. A counter is set to examine the audio line for a time period called DURATION. During the examination of the audio line another counter starts counting, waiting for a silence period of a length called TRIGGER. The test will terminate as soon as a silence period equal to TRIGGER is detected, or DURATION expires, whichever occurs first. DURATION and TRIGGER are expressed in "clock ticks" which occur at the rate of 18 times per second in the personal computer of the preferred embodiment. In the preferred embodiment all DURATION and TRIGGER parameters would be easily modifiable software parameters so that "fine tuning" for a particular type or types of automated answering devices would be possible. Typical settings are indicated in FIG. 7.

The system at step 202, sets TRIGGER at 27 which is translated to 1.5 seconds and sets DURATION at 72 which is 4.0 seconds. At step 204, the system moves to step 300, for Silence Detection Operation. At this point the system is enabled to actually examine the audio detection signal on the audio/telephone interface adapter, and count the personal computer's "clock ticks". At step 206 the result of Silence Detection Operation is examined. If the TRIGGER silence period was detected then the answering party is determined not to be a recording and therefore the system defines the called party as a live person. The return variable RTN is set to zero at step 208. The system then moves to step 230, indicating the completion of its detection. If the TRIGGER silence period was not detected within DURATION, then system determines that audio is present most of the time and the party could be either a person with a lengthy greeting or a recording. At step 210, a voice message to the effect of "One moment please . . ." is then played to the called party and the second test period begins at step 212, with another call to Silence Detection Operation beginning at step 214. Once again, at step 216 the result of Silence Detection Operation is examined. If the TRIGGER silence period was detected then the answering party is determined not to be a recording and therefore the system defines the called party as a live person. The return variable RTN is set to zero at step 218. The system then moves to step 230, indicating the completion of the detection. If the TRIGGER silence period was not detected within DURATION then audio was present most of the time and the party is determined to be a recording since a person would probably have ceased speaking after hearing the "One moment please . . ." message.

If the called party is determined to be a recording then a third test begins at step 220 to detect if and when it finishes playback of its message. The DURATION parameter is set to a reasonable maximum period for a message length for a call answering device such as 900 (50 seconds) and a third move to step 300 is initiated for Silence Detection Operation. If the TRIGGER silence period is detected at step 222, then the called party is determined to be a recording which stopped. At step 226 the RTN variable is set to 1 and the system then moves to step 230, indicating the completion of its detection. If at step 224, TRIGGER silence period is not detected within the DURATION period then the called party is determined to be a recording which did not stop. At step 228, the RTN variable is set to 2, meaning "endless audio". The system then moves to step 230, indicating the completion of its detection.

Figure 8:
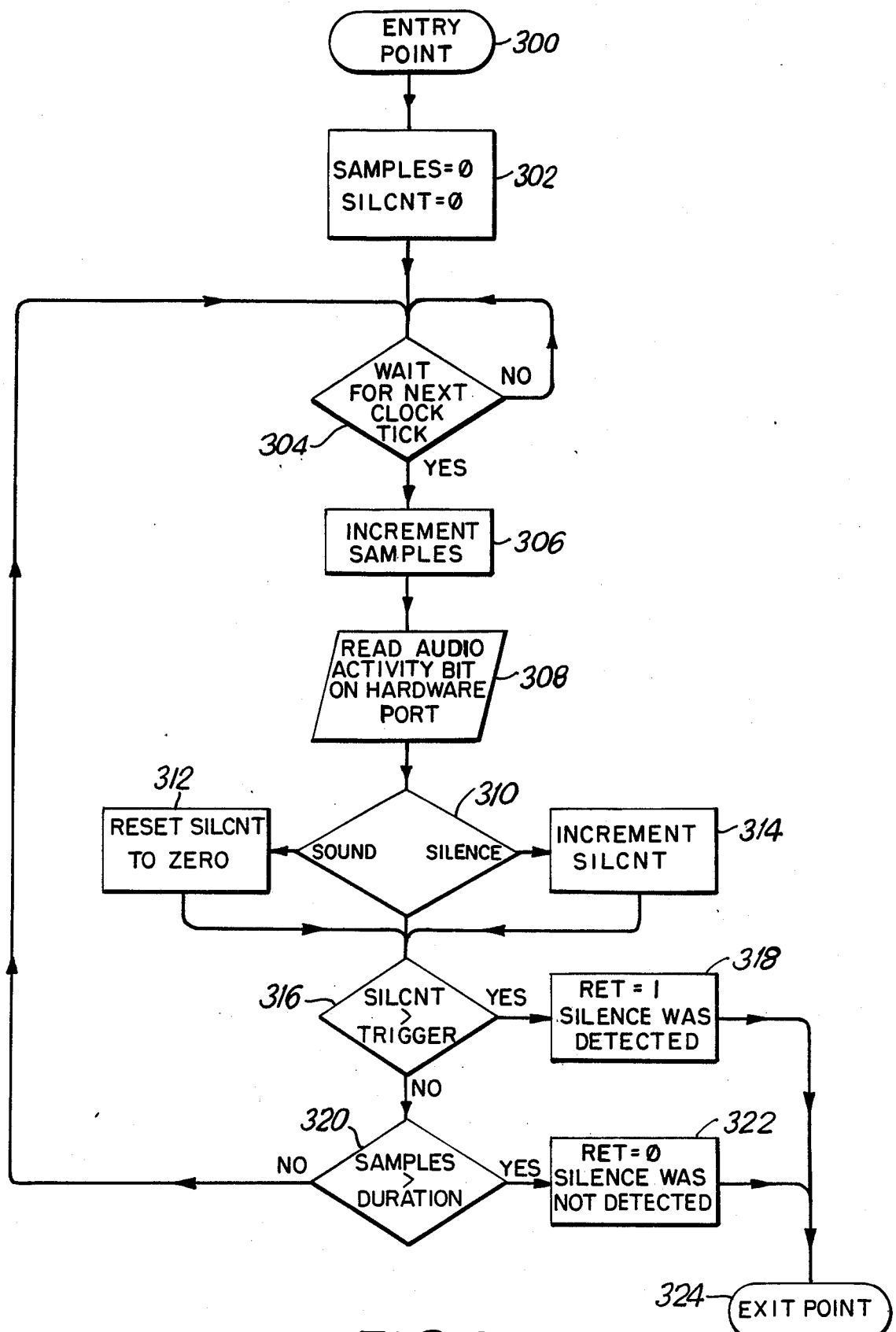
FIG. 8 illustrates the logical diagram of the operations determining the presence or absence of audio in the telephone line during a certain period of time.

Referring to FIG. 8, the Silence Detection Operation is described in more detail. This operation is conducted by sampling the audio detection signal line of the audio/telephony interface adapter once every cycle of the personal computer's 50 millisecond clock. At step 302 two variables called SAMPLES and SILCNT are initialized to zero. SAMPLES keeps a running count of total samples made and SILCNT keeps a count of consecutive samples with a silence indication. A loop is entered at step 304, which waits for the next "clock tick" that occurs approximately every 50 milliseconds.

As soon as a "clock tick" occurs, the system moves to step 306 and SAMPLES is incremented by one. The audio activity bit of the status port of the audio/telephony interface adaptor is read at step 308 The system then moves to step 310. If the result is silence, then the system moves to step 314, and SILCNT is incremented by one. If the result is audio, then the system moves to step 312, and SILCNT is reset to zero. At 316, SILCNT is compared to the value of TRIGGER which was set at steps 202, 212 and 220. If SILCNT is greater than TRIGGER then the return variable RET is set to 1 at step 318 indicating that silence was detected. The system then moves to step 324 indicating that Silence Detection Operation, has been completed. If SILCNT is not greater than TRIGGER, then at step 320 SAMPLES is compared to the value of DURATION which was set at steps 202, 212 and 220. If SAMPLES is greater than DURATION then the return variable RET is set to zero at step 322, indicating that silence was not detected. The system then moves to steps 324, indicating that the Silence Detection Operation is completed. Silence Detection Operation can be modified so that it could return actual count of sound and silence samples in addition to the RTN variable. These counts could prove useful in the detection of specific recording device types where the greeting audio pattern is consistent and known.

Figure 9:
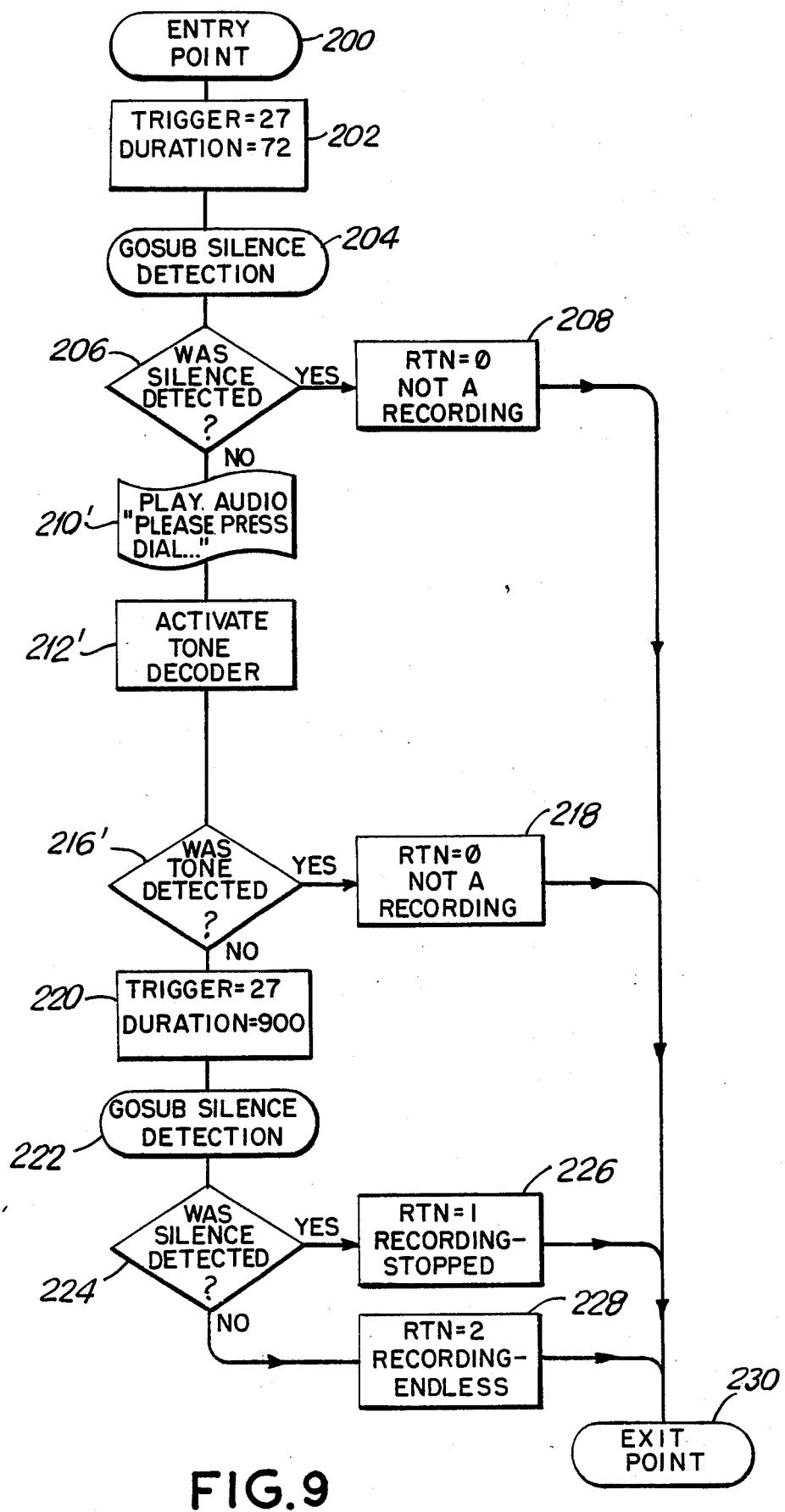
FIG. 9 illustrates a modified version of the operations of the present invention utilizing a tone detector.
Figure 10:
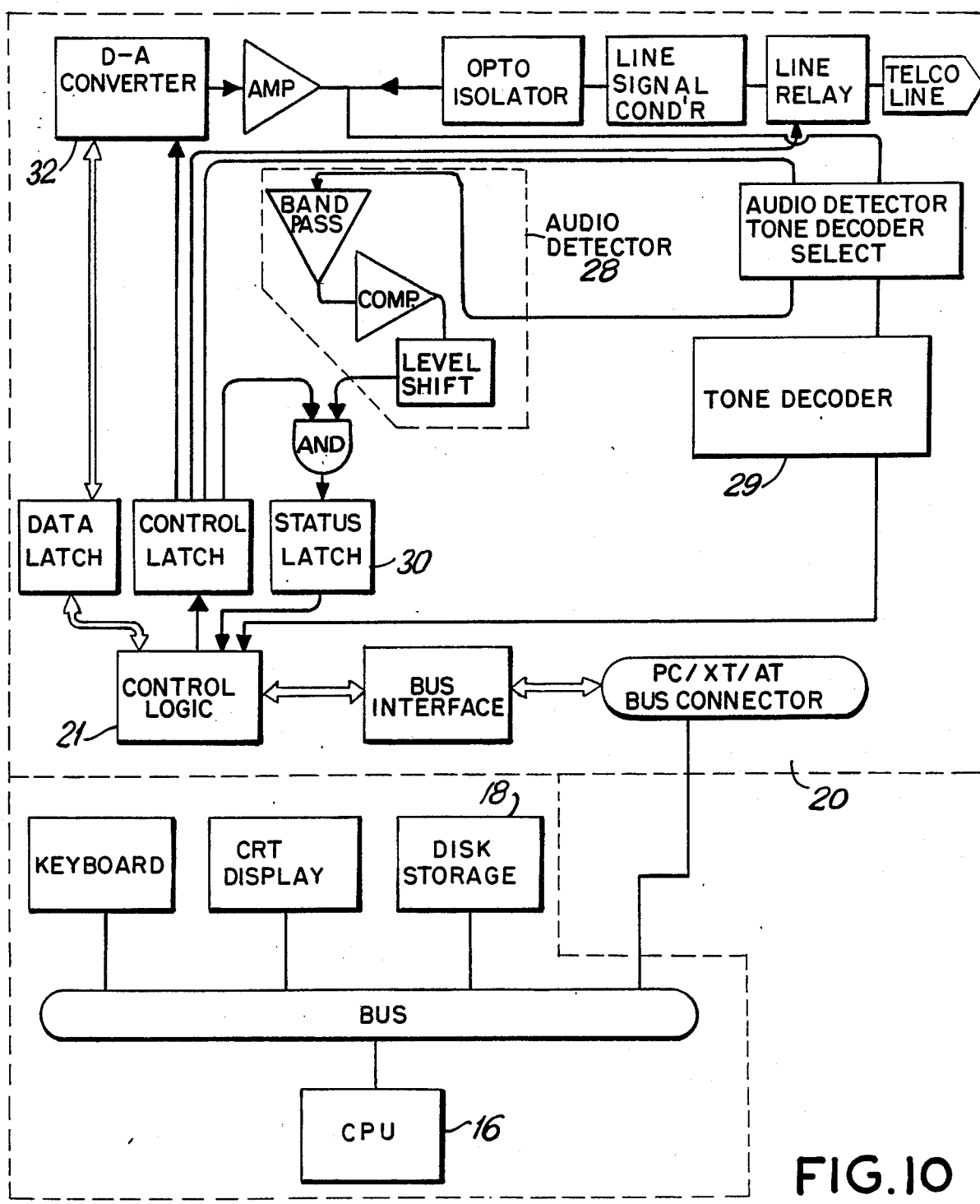
FIG. 10 is a block diagram of a modified system utilizing the components of the telephone dialing device with a tone detector.

Another embodiment of this invention is presented in FIGS. 9 and 10. As illustrated in FIG. 9 and step 210', it is obvious to those skilled in the art that step 210 of FIG. 7 could be modified so that a message, to the effect that requires a called party to press a specific dial tone, is transmitted. A tone decoder 29 as illustrated in FIG. 10 is activated at modified step 212'. The system at step 216' determines if the called party has responded by pressing the dial tone. If the dial tone is pressed the system moves to step 218 and same operations that were explained for FIG. 7, will resume. If the tone decoder could not detect the requested dial tone the system moves to step 220 and same operations that were explained for FIG. 7, will resume.

In the specific embodiments explained herein, the personal computer could be any available PC like IBM "PC", "XT" or "AT" models. The digital audio/telephony interface adapter is the type similar to IBM Voice Communications Option Adapter part no. 6294771. The number of subscriber lines attached to personal computer based autodialer may be increased from one to as many as desired by use of several audio-/telephony interface adapters or by use of adapters which support several subscriber lines. The system operations is implemented by application software written in any suitable personal computer programming language, like the one illustrated in the Appendix.

Although illustrative embodiments of the present invention have been described in detail with reference to accompanying drawings, it is obvious to those skilled in the art that modifications to the system described herein, can be implemented in many other designs, like hardware based systems, or analog voice storing and receiving techniques instead of the digital conversion. These and other various changes and embodiments may be effected by one skilled in the art without departing from the spirit and the scope of the invention, which is intended to be determined by reference to the claims and their equivalent in light of the prior art.

APPENDIX

```
17010   ' ================================================================
17020   ' ROUTINE TO DETERMINE WHETHER CONNECTED CALL IS HUMAN OR MACHINE
17030   ' AND IF A MACHINE TO COORDINATE MESSAGE DELIVERY WITH THE MACHINE'S
17040   ' RECORD CYCLE.
17050   '
17060   ' WRITTEN IN BASIC FOR OPERATION IN AN IBM PC OR EQUIVALENT PERSONAL
17070   ' COMPUTER.
17080   '
17090   ' Copyright (c)1988 U.S. Telecom Int'l, Inc.
17100   ' ================================================================
17110   '
17120   '
17130   'PROVIDE:
17140   ' siltrig1% = Initial silence period to test for (ex. 1.5 seconds)
17150   ' testprd1% = Initial test period duration (ex. 4.0 seconds)
17160   ' siltrig2% = Second silence period to test for (ex. 1.5 seconds)
17170   ' testprd2% = Initial test period duration (ex. 4.0 seconds)
17180   ' siltrig3% = Third silence period to test for (ex. 1.5 seconds)
17190   ' testprd3% = Fourth test period duration (ex. 50.0 seconds)
17200
17210   RETURN VALUES FOR rtn% :
17220   ' 0 = not a continuous recording - assume human
17230   ' 1 = continuous recording - waited for it to stop
17240   ' 2 = continuous recording which never stopped
17250   '
17260   '
17500   rtn% = 0
17510   '
17520   '--- Initial test for continuous audio on the line ---
17530   trigger% = siltrig1%/.055                              '27 clock ticks
```

```
17540      duration% = testprd1%/.055                      '72 clock ticks
17550      gosub 18000                                     'test for silence
17560      if ret% = 1 then rtn% = 0 : goto 17720          'silence detected
17570
17580      '--- Continuous audio heard - ask party to stop talking ---
17590      call (PLAYFILE, "WAIT.PRP",ret%) 'Play "one moment please" prompt
17600      trigger% = siltrig2%                            '27 clock ticks
17610      duration% = testprd 2%                          '72 clock ticks
17620      gosub 18000                                     'test or silence
17630      if ret% = 1 then rtn% = 0 : goto 17720          'silence detected
17640      '
17650      '--- Continuous audio still heard - wait for it to stop ---
17660      trigger% = siltrig3%                            '27 clock ticks
17670      duration% = testprd3%                           '909 clock ticks
17680      gosub 18000                                     'test for silence
17690      if ret% = 1 then rtn% = 1 : goto 17720          'silence detected
17700      rtn% = 2                                        'audio timed-out
17710
17720      return 18000      '===== Detect A Silence Interval In Audio Stream ===
18010      ' PROVIDE: duration% = max number of samples - one per clock tick
18020      '          trigger% = number of silence samples in a row to detect
18030      ' RETURNS: ret%  0 = timeout without detection,  1 = detected
18040      '
18050      samples% = 0                                    'cycles tested
18060      silcnt% = 0                                     'consecutive silence
18070      gosub 19000                                     'read system clock
18080      a# = clock#
18090      while clock# = a#                               'wait for next tick
18100        gosub 19000                                   'read system clock
18110      wend
18120      a# = clock#
18130      samples% = samples% + 1                         'incr samples count
18140      '--- increment silence count if silence else reset count to zero ---
18150      if inp(ioport%+1) and &h20 then silcnt% = 0 else silcnt% = silcnt% + 1
18160      if silcnt% > trigger% then ret% = 1 : return    'silence detected
18170      if samples% > duration% then ret% = 0 : return  'const audio
18180      goto 18090                                      'next sample 19000      ' ================================================================
19010      ' TIMER FUNCTION EMULATOR OR BASIC AND IBM PC
19020      ' Returns clock# as number of clock cycles elapsed since midnight
19030      '         at 18.2055/second
19040      '
19050      def seg = 0
19060      for i% = 0 to 3
19070          byt%(i) = peek(&h46c+i%)
19080      next i%
19090      clock# = 0
19100      for i% = 0 to 3
19110          clock# = clock# + byt%(i%) * (256^i%)
19120      next i%
19130      def seg
19140      return
```

What is claimed is:

1. An improved automated telephone dialing and message delivery system, comprising:
   means for automatically dialing a telephone number over a communication channel so as to establish a communications channel with a called telephone;
   means for detecting a presence or absence of an audio signal over the communications channel emanating from the called telephone;
   means for providing audio instructions to the called telephone after the presence of an audio signal is detected emanating from the called telephone;
   means for determining if the audio instructions are acknowledged by a party at the called telephone;
   means for providing audio messages to a live party when audio instructions are acknowledged;
   means for delivery of messages to a telephone answering device when audio instructions are not acknowledged, including means for detecting the absence of any audio signal emanating from the called telephone and means for providing audio messages to the telephone answering device when no audio signal is emanating from the called telephone.

2. An automated telephone dialing and message delivery system, comprising:
   a telephone dialing interface between a controller and a communications channel so as to establish a communications channel with a called telephone;
   an audio detector circuit to determine a presence or absence of an audio signal over the communications channel emanating from the called telephone;
   an audio/telephony interface and controller to provide audio instructions to the called telephone after the presence of an audio signal is detected from the called telephone;
   an audio detection routine to operate with the audio detector circuit to determine if the audio instructions are acknowledged by a party, a record mode answering machine, or an endless message answering machine;
   an audio routine to operate the audio telephony interface to provide audio messages to a live party when the audio instructions are acknowledged by a party;
   an audio routine to operate the audio telephony interface to provide a message to a record mode answering machine;
   a routine to disconnect the established communications channel if the called telephone was answered by an endless message answering machine.

3. An automated telephone dialing and message delivery system as in claim 2 wherein the audio instructions request the called party to wait.

4. An automated telephone dialing and message delivery system as in claim 2 wherein the audio instructions request the called party to press/dial a number.

5. An automated telephone dialing and message delivery system as in claim 3 wherein the audio detection routine determines a type of answer by waiting for a period of silence after the audio instruction.

6. An automated telephone dialing and message delivery system as in claim 5 wherein the silence period for a live party determination is more than 1.5 seconds immediately after the instructions.

7. An automated telephone dialing and message delivery system as in claim 5 wherein the audio detection routine determination for a record mode answering machine is made by finding no immediate silent period after the instructions but finding a silent period during a maximum time period for a message length for a call answering device.

8. An automated telephone dialing and message system as in claim 4 wherein the audio detection routine determines a type of answer by detecting if the called party pressed/dialed the number.

9. An automated telephone dialing and message delivery system as in claim 8 wherein the audio detection routine determination for a record mode answering machine is made by not detecting a pressed/dialed number but finding a silent period during a maximum time period for a message length for a call answering device.

10. An automated telephone dialing and message delivery system as in claim 2 wherein the audio detection routine determination for an endless message answering machine is made by finding no silent period after a maximum time period for a message length for a call answering device has expired.

11. An automated telephone dialing and message delivery system as in claim 2. Also comprising a storage unit to record results from the audio detection routine.

12. An automated telephone dialing and message delivery system as in claim 11 wherein the results recorded include number called and type of answer.

13. A method to improve automated telephone dialing and message delivery, comprising the steps of;
   automatically dialing through a communications channel to establish a communications channel with a called telephone;
   detecting a presence or absence of an audio signal over the communications channel emanating from the called telephone;
   providing audio instructions to the called telephone after the presence of an audio signal is detected from the called telephone;
   determining if the audio instructions are acknowledged by a party, a record mode answering machine, or an endless message answering machine, at the called telephone.
   providing audio messages to a live party when the audio instructions are acknowledged;
   providing audio messages during a record mode of a record mode answering machine;
   disconnecting the established communications channel if the called telephone is answered by an endless message answering machine.

14. A method to improve automated telephone dialing and message delivery as in claim 13 wherein the audio instructions instruct the called party to wait.

15. A method to improve automated telephone dialing and message delivery as in claim 13 wherein the audio instructions instruct the called party to press/dial a number.

16. A method to improve automated telephone dialing and message delivery as in claim 14 wherein determining a type of answer is performed by waiting for a silent period after the audio instructions.

17. A method to improve automated telephone dialing and message delivery as in claim 16 wherein a live party is determined by finding a silent period of more than 1.5 seconds immediately following the audio instructions.

18. A method to improve automated telephone dialing and message delivery as in claim 16 where in a record mode answering machine is determined by finding a silent period at a time after the instructions are given but before a maximum time period for an answering machine has expired.

19. A method to improve automated telephone dialing and message delivery as in claim 15 wherein determining a live party is performed by detecting a pressed/dialed number.

20. A method to improve automated telephone dialing and message delivery as in claim 19 wherein determining a record mode answering machine is made by not detecting a pressed/dialed number but finding a silent period during a maximum time period for a message length for a call answering machine.

21. A method to improve automated telephone dialing and message delivery as in claim 13 wherein an endless message answering machine is determined by finding no silent period after a maximum time period for a message length for a call answering device has expired.

22. A method to improve automated telephone dialing and message delivery as in claim 13 also comprising the step of storing the results of each call.

23. A method to improve automated telephone dialing and message delivery as in claim 22 wherein stored results include number dialed and type of answer.

* * * * *